(12) United States Patent
Lee et al.

(10) Patent No.: US 8,805,067 B2
(45) Date of Patent: Aug. 12, 2014

(54) SCALABLE FEATURE DESCRIPTOR EXTRACTION AND MATCHING METHOD AND SYSTEM

(75) Inventors: Keun-Dong Lee, Daejeon-si (KR); Sang Il Na, Daejeon-si (KR); Weon-Geun Oh, Daejeon-si (KR); Sung-Kwan Je, Daejeon-si (KR); Hyuk Jeong, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 88 days.

(21) Appl. No.: 13/548,098

(22) Filed: Jul. 12, 2012

(65) Prior Publication Data
US 2013/0223730 A1    Aug. 29, 2013

(30) Foreign Application Priority Data
Feb. 28, 2012    (KR) .................. 10-2012-0020556

(51) Int. Cl.
*G06K 9/00*    (2006.01)
(52) U.S. Cl.
USPC ........... 382/165; 382/100; 382/162; 382/190; 382/298; 382/199
(58) Field of Classification Search
CPC ..... G06K 9/00; G06K 9/4671; G06K 9/4676; G06K 9/3233; G06K 9/4604
USPC ......... 382/100, 162, 165, 276, 296, 298, 308, 382/201, 195, 199, 190
See application file for complete search history.

(56) References Cited

U.S. PATENT DOCUMENTS

| | | | |
|---|---|---|---|
| 8,184,155 B2 * | 5/2012 | Ke et al. .................. | 348/142 |
| 2010/0183071 A1 * | 7/2010 | Segall et al. ............ | 375/240.16 |
| 2010/0226575 A1 | 9/2010 | Grzeszczuk et al. | |
| 2012/0263388 A1 * | 10/2012 | Vaddadi et al. ............ | 382/225 |
| 2013/0027775 A1 * | 1/2013 | Zuniga et al. ................. | 359/554 |

FOREIGN PATENT DOCUMENTS

KR    10-2011-0091763 A    8/2011

OTHER PUBLICATIONS

Herbert Bay et al., "SURF: Speeded Up Robust Features", pp. 1-14.

\* cited by examiner

*Primary Examiner* — Ali Bayat

(57) ABSTRACT

A feature descriptor extracting method in a feature descriptor extracting apparatus is provided. The feature descriptor extracting method involves receiving an image from which a feature descriptor will be extracted, extracting a point at which a change in a pixel statistical value of the image is large as a feature point, and extracting a patch centered on the feature point, blocking the patch to calculate a statistical value of each of a plurality of patch blocks, calculating a morphological gradient by using a statistical value of the block-converted patch, and extracting a feature descriptor by using the morphological gradient in consideration of required feature descriptor complexity.

11 Claims, 10 Drawing Sheets

1) DIFFERENCE BETWEEN MAXIMUM STATISTICAL VALUE AND MINIMUM STATISTICAL VALUE : S(M) - S(m)

2) DISTANCE BETWEEN TWO BLOCKS : $\ell$

3) ANGLE BETWEEN HORIZONTAL LINE AND LINE SEGMENT CONNECTING TWO BLOCKS : $\theta$ 1) DILATION RESIDUE GRADIENT : S(M) - S(x)
2) EROSION RESIDUE GRADIENT : S(x) - S(m)
3) DISTANCE BETWEEN M BLOCK AND m BLOCK : $\ell_1$
4) DISTANCE BETWEEN X BLOCK AND m BLOCK : $\ell_2$
5) ANGLE BETWEEN LINE SEGMENT CONNECTING CONNECTING M BLOCK AND m BLOCK AND LINE SEGMENT CONNECTING X BLOCK AND m BLOCK : $\theta_1$
6) AREA OF TRIANGLE DEFINED BY THREE POINTS :
   Surface = $\ell_1 \ell_2 \sin(\theta_1)/2$

SCALABLE FEATURE DESCRIPTOR EXTRACTION AND MATCHING METHOD AND SYSTEM

CROSS-REFERENCE TO RELATED APPLICATION

This application claims the benefit under 35 U.S.C. §119 (a) of Korean Patent Application No. 10-2012-0020556, filed on Feb. 28, 2012, the entire disclosure of which is incorporated herein by reference for all purposes.

BACKGROUND

1. Field

The following description relates to feature-based image processing technology, and more particularly, to an apparatus and a method for effectively extracting a feature descriptor from an image.

2. Description of the Related Art

Technology for generating a feature descriptor based on a feature point extracted from an image, and matching the feature descriptor with another feature descriptor, is applied in various fields dealing with computer vision, such as content-based image retrieval, object recognition and detection, and video tracking, and is the subject of much research.

Recently, due to the introduction of smart phones, the amount of distributed multimedia content is explosively increasing, and demand for the above-mentioned technology associated with computer vision for effectively retrieving and consuming the multimedia content is increasing. Especially, due to inconvenience in inputting letters that is characteristic of smart phones, the need for content-based image retrieval technology that performs retrieval by inputting an image is increasing, and a retrieval application using the existing feature-based image processing technology is being actively created.

In the existing feature-based image processing technology, there are technology using a global feature and local feature-based image processing technology using a feature point. Here, the local feature-based image processing technology using the feature point has high accuracy, and thus is attracting much attention.

Scale-Invariant Feature Transform (SIFT) and Speeded Up Robust Features (SURF) are representative examples of the local feature-based image processing technology using the feature point. Such technologies extract a point for which change in a pixel statistical value is large, like a corner, as a feature point from a scale space, and extract a feature descriptor by using a relationship between the extracted point and a peripheral region. Such technology requires a number of operations and consumes a lot of memory in the process of extracting a feature descriptor and the process of matching, and thus is not appropriate for a mobile smart phone environment.

Moreover, even when a simple feature descriptor is required according to the purpose (content-based image retrieval and object detection in a specific category) and environment (mobile environment or high-performance personal computer (PC) environment) of a technical field of application, a number of operations are required to extract a single feature descriptor.

SUMMARY

The following description relates to an apparatus and a method for extracting and matching a scalable feature descriptor having scalability according to a purpose and an environment to which technology for extracting a feature descriptor is applied.

In one general aspect, a feature descriptor extracting method in a feature descriptor extracting apparatus includes: receiving an image from which a feature descriptor will be extracted; extracting a point at which a change in a pixel statistical value of the image is large as a feature point, and extracting a patch centered on the feature point; block-converting the patch and calculating a statistical value of each of a plurality of patch blocks; calculating a morphological gradient by using a statistical value of the block-converted patch; and extracting a feature descriptor by using the morphological gradient in consideration of required feature descriptor complexity.

In another general aspect, a feature descriptor extracting apparatus includes: an image input unit configured to receive an image from which a feature descriptor will be extracted; a feature point and patch extractor configured to extract a point at which a change in a pixel statistical value of the image is large as a feature point, and extracting a patch centered on the feature point; a feature point patch statistic calculator configured to block-convert the patch and calculate a statistical value of each of a plurality of patch blocks; a morphological gradient calculator configured to calculate a morphological gradient by using a statistical value of the block-converted patch; and a feature descriptor extractor configured to extract a feature descriptor by using the morphological gradient in consideration of required feature descriptor complexity.

In another general aspect, a matching method using a feature descriptor includes: receiving a plurality of feature descriptors to be matched; comparing similarity between the feature descriptors based on complexities of the feature descriptors; determining two feature descriptors to match when the similarities satisfy a predetermined threshold value and other conditions; and comparing all similarities between the feature descriptors and then performing matching image by image according to the comparison result.

Other features and aspects will be apparent from the following detailed description, the drawings, and the claims.

Figure 1:
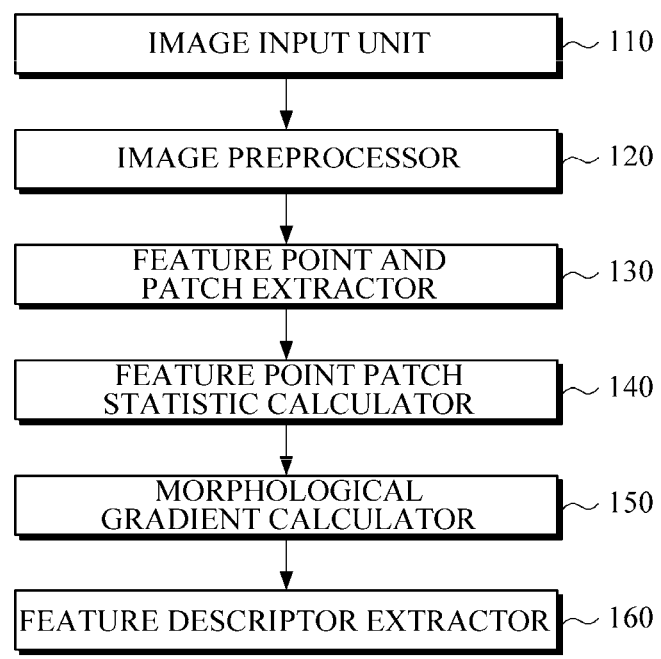
FIG. 1 is a block diagram illustrating a feature descriptor extracting apparatus according to an embodiment of the present invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will suggest themselves to those of ordinary skill in the art. Also, descriptions of well-known functions and constructions may be omitted for increased clarity and conciseness.

Hereinafter, embodiments of the present invention will be described in detail with reference to the accompanying drawings.

FIG. 1 is a block diagram illustrating a feature descriptor extracting apparatus according to an embodiment of the present invention.

Referring to FIG. 1, the feature descriptor extracting apparatus includes an image input unit 110, an image preprocessor 120, a feature point and patch extractor 130, a feature point patch statistic calculator 140, a morphological gradient calculator 150, and a feature descriptor extractor 160.

The image input unit 110 receives an image from which a feature descriptor will be extracted. For example, the image input unit 110 may obtain an image from a camera that captures a live image or a database through a communicator.

The image preprocessor 120 converts the received image into a black image, and normalizes the size of the black image to a fixed M×N size in consideration of the ratio of the received image.

The feature point and patch extractor 130 extracts a point at which a change in a pixel statistical value is large, like a corner, as a feature point from a scale space of the black image normalized by the image preprocessor 120, and calculates the scale of the extracted point.

Figure 2:
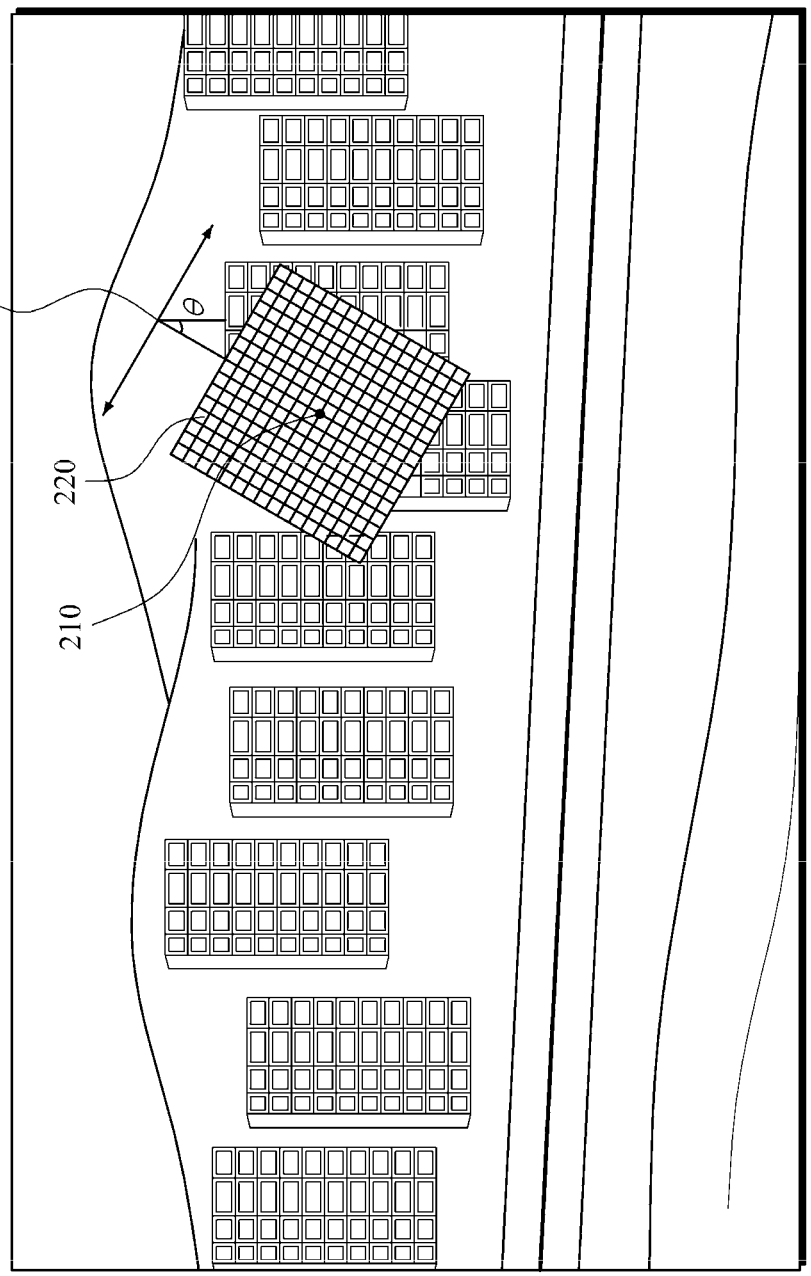
FIG. 2 is a diagram for describing the extraction of a feature point and a patch according to an embodiment of the present invention.

FIG. 2 is a diagram for describing the extraction of a feature point and a patch according to an embodiment of the present invention.

Referring to FIG. 2, the feature point and patch extractor 130 extracts a patch region 220 with a feature point 210 as its center according to the scale of the feature point 210 extracted from an image. The feature point and patch extractor 130 calculates the scale and orientation angle of the patch 220 such that the patch 220 is robust with respect to change in scale and orientation.

The scale of the patch 220 is determined by the scale of the feature point 210. A method of extracting a feature point and a patch and calculating a scale and an orientation angle may use a fast-Hessian detector according to an embodiment of the present invention.

Referring again to FIG. 1, the feature point patch statistic calculator 140 performs block conversion on a patch extracted by the feature point and patch extractor 130, and calculates statistical values including an average value and standard deviation of each of a plurality of patch blocks. This will be described below with reference to FIG. 4.

The feature point patch statistic calculator 140 performs block conversion on the patch, and calculates a statistical value of patch blocks. This will be described below.

The morphological gradient calculator 150 calculates a morphological gradient and a value associated with the morphological gradient by using the statistical value of the patch blocks calculated by the feature point patch statistic calculator 140. This will be described below.

The feature descriptor extractor 160 extracts a feature descriptor by using the morphological gradient in consideration of the complexity of a necessary feature descriptor.

Figure 3:
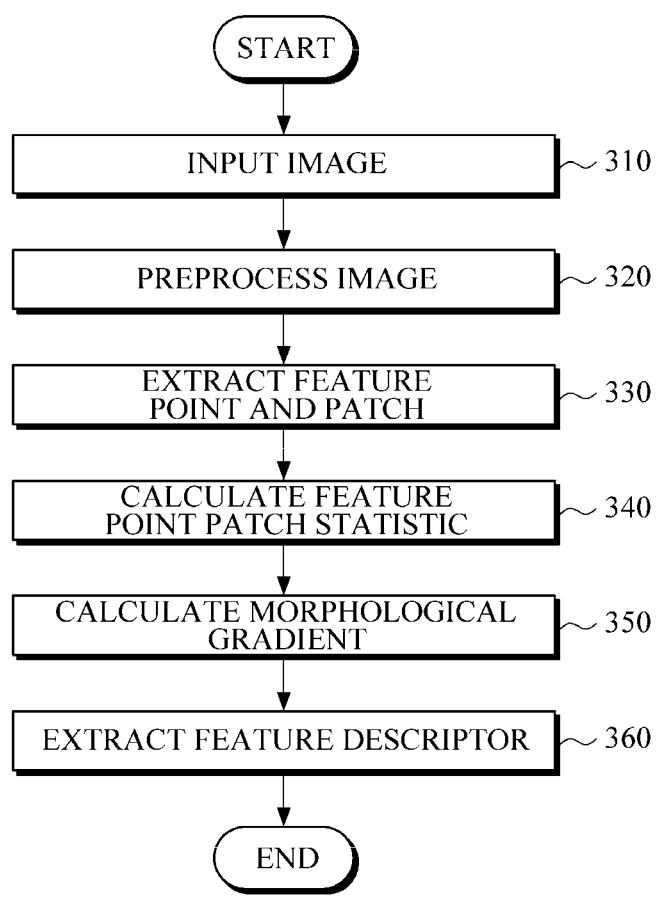
FIG. 3 is a flowchart for describing a feature descriptor extracting method according to an embodiment of the present invention.

FIG. 3 is a flowchart for describing a feature descriptor extracting method according to an embodiment of the present invention.

Referring to FIG. 3, the image input unit 110 of the feature descriptor extracting apparatus receives an image from which a feature descriptor will be extracted in operation 310. Then, the image preprocessor 120 converts the received image into a black image, and performs a preprocessing function that normalizes the size of the black image to a fixed M×N size in consideration of the ratio of the received image, in operation 320.

The feature point and patch extractor 130 extracts a point at which a change in a pixel statistical value is large, like a corner, as a feature point from a scale space of the normalized black image, and calculates the scale of the extracted point, in operation 330.

The feature point patch statistic calculator 140 performs block conversion on the patch, and calculates statistical values including an average value and standard deviation of each of a plurality of patch blocks, in operation 340. This will be described below with reference to FIG. 4.

Figure 4:
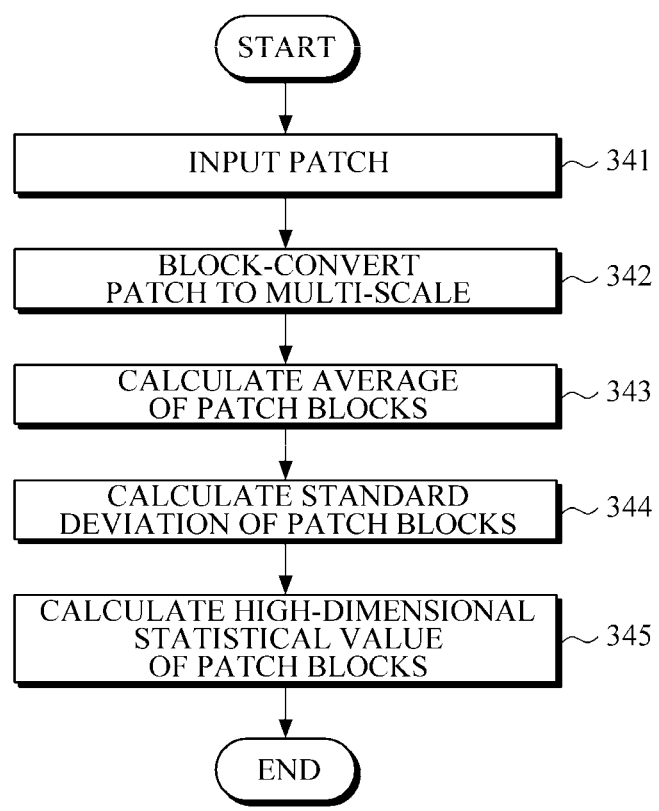
FIG. 4 is a flowchart for describing an operation of a feature descriptor patch statistic calculator according to an embodiment of the present invention.

FIG. 4 is a flowchart for describing an operation of the feature descriptor patch statistic calculator according to an embodiment of the present invention.

Referring to FIG. 4, the feature point patch statistic calculator 140 receives a patch extracted by the feature point and patch extractor 130 in operation 341. The feature point patch statistic calculator 140 performs multi-scale block conversion on the patch in operation 342.

Figure 5:
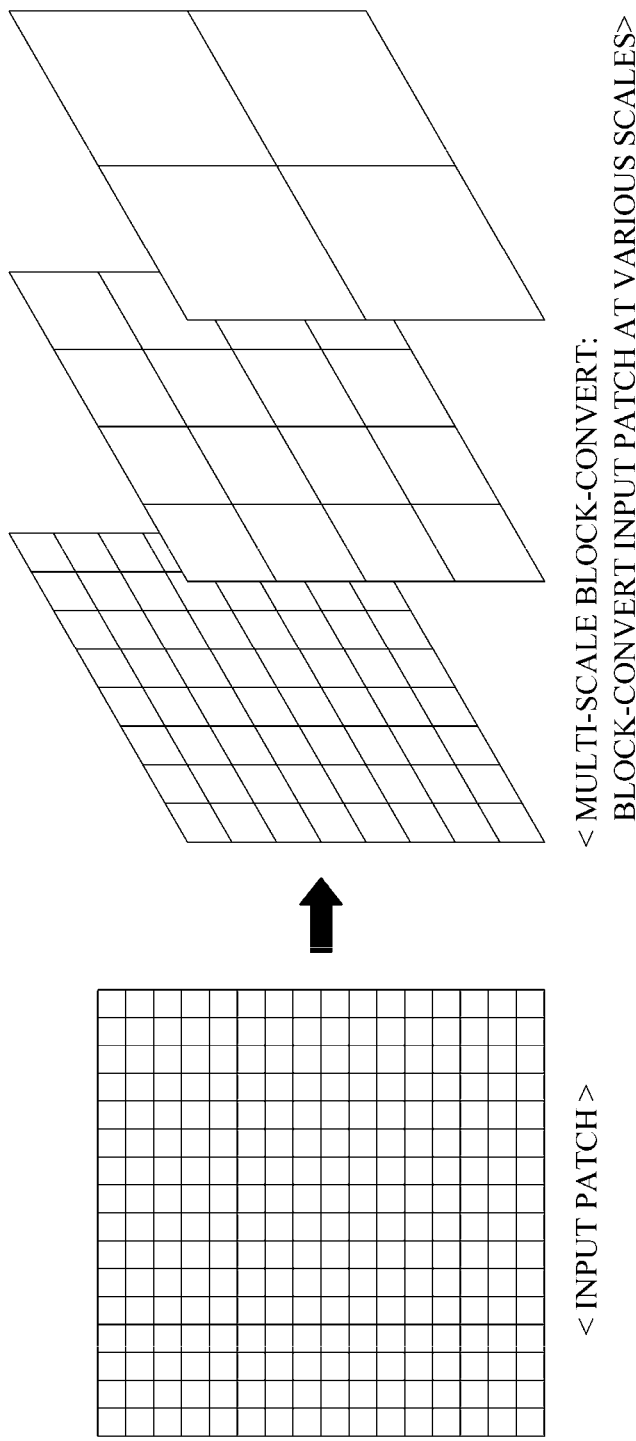
FIG. 5 is a diagram illustrating an example of patch multi-scale block conversion.

FIG. 5 is a diagram illustrating an example of patch multi-scale block conversion.

Referring to FIG. 5, the feature descriptor extracting apparatus divides an input patch having a 16×16 size into blocks at three scales, such that the number of blocks becomes 8×8, 4×4, and 2×2. According to another embodiment of the present invention, an input patch may be divided into blocks at four or more scales.

Referring again to FIG. 4, the feature point patch statistic calculator 140 calculates a patch block average of the block-converted patch in operation 343. The feature point patch statistic calculator 140 calculates a standard deviation in operation 344. The feature point patch statistic calculator 140 calculates a high-dimensional statistical value in operation 345.

Figure 6:
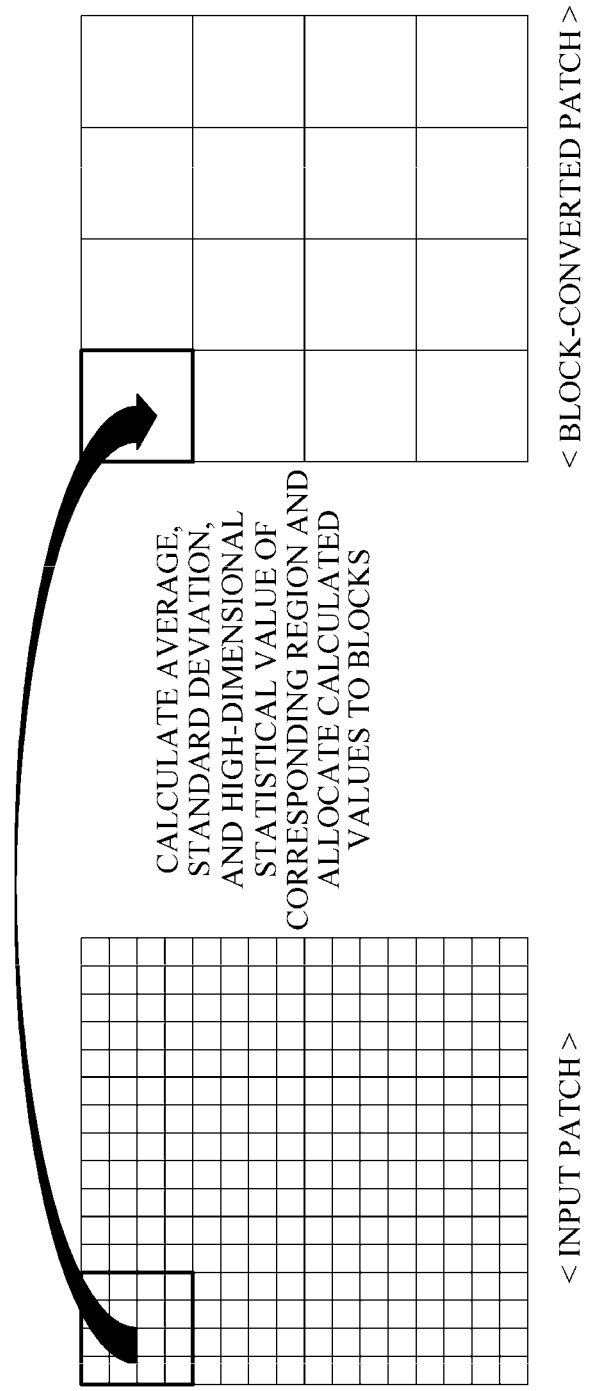
FIG. 6 is a diagram for describing calculation of a patch block statistical value according to an embodiment of the present invention.

FIG. 6 is a diagram for describing calculation of a patch block statistical value according to an embodiment of the present invention.

Referring to FIG. 6, the feature point patch statistic calculator 140 calculates a statistical value (for example, a high-dimensional statistical value such as average, standard deviation, skewness, or kurtosis) or a degree of symmetry in an input patch region corresponding to an nth block of the block-converted patch, and allocates the calculated value as a statistical value "S(n)" of the nth block.

The feature point patch statistic calculator 140 may use an integral image for calculating the statistical value at a high speed. Also, the statistical value calculating operation is performed identically on multi-scale block-converted patches.

Referring again to FIG. 3, the morphological gradient calculator 150 calculates a morphological gradient, "l", and "θ" with the statistical values of the block-converted patches calculated by the feature point patch statistic calculator 140 in operation 350.

Figure 7:
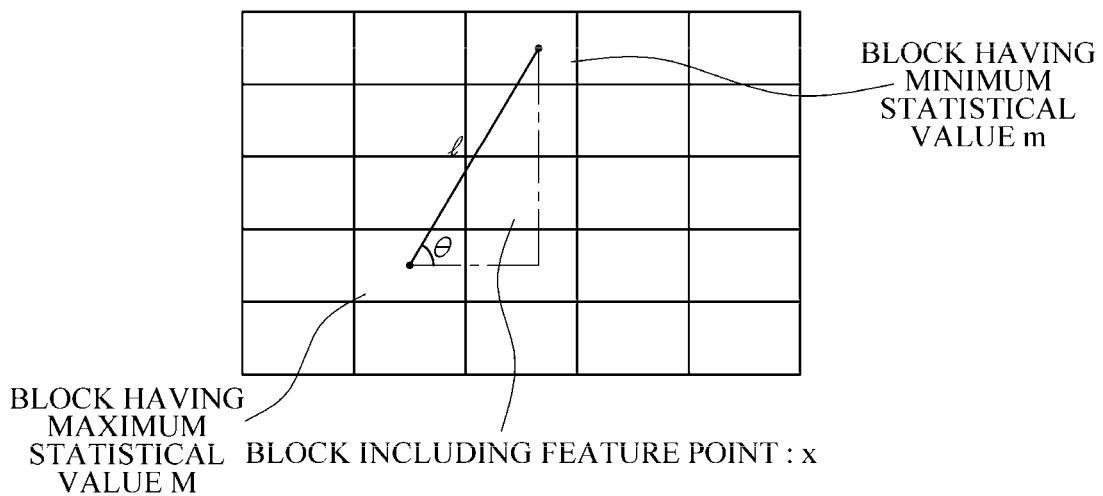
FIG. 7 is a diagram for describing calculation of a morphological gradient, "l", and "θ" according to an embodiment of the present invention.

FIG. 7 is a diagram for describing calculation of a morphological gradient, "l", and "θ" according to an embodiment of the present invention.

Referring to FIG. 7, the morphological gradient is a difference between a value of a block 610 having a maximum statistical value and a value of a block 620 having a minimum statistical value among statistical values of blocks. "l" is a distance between the block having the maximum statistical value and the block having the minimum statistical value. "θ" denotes an angle between a horizontal line and a line segment that connects the block having the maximum statistical value and the block having the minimum statistical value. This will be described below with reference to FIG. 4.

A morphological gradient in a black image may be defined as expressed in the following Equation (1).

$$\nabla(f) = \delta_g(f) - \epsilon_g(f) \quad (1)$$

where f is a brightness value of a black image, and g is a structuring element having symmetric characteristic. $\delta_g(f)$ is a dilation residue gradient and is defined as expressed in the following Equation (2). $\epsilon_g(f)$ is an erosion residue gradient and is defined as expressed in the following Equation (3).

$$\delta_g(f) = \max_{X \in g}\{f(X)\} - f(X) \quad (2)$$

$$\epsilon_g(f) = f(X) - \min_{X \in g}\{f(X)\} \quad (3)$$

Equation (1) may be changed to the following Equation (4) by using Equations (2) and (3).

$$\nabla(f) = \max_{X \in g}\{f(X)\} - \min_{X \in g}\{f(X)\} \quad (4)$$
$$= \max(|f(X) - f(Y)|), \forall_{X,Y} \in g$$

That is, the morphological gradient may be defined as a greatest brightness difference in the structuring element "g".

In the present invention, the morphological gradient is applied to the statistical value of the block-converted patch calculated by the feature point patch statistic calculator 140. In a multi-scale block-converted patch, with the entirety of each block-converted patch as the structuring element "g", when the block having the maximum statistical value in the structuring element is M and the block having the minimum statistical value in the structuring element is m, a maximum value "S(M)−S(m)" of a statistical difference is defined as the morphological gradient.

Moreover, the feature point extracting apparatus calculates "l", the distance between the two blocks "M" and "m", and "θ", the angle between a horizontal line and a line segment that connects the two blocks. In a patch configured with N×M number of blocks, when an index of a left upper block is (0,0), an index of a right lower block is (N−1,N−1), an index of the block "M" is $(X_m, Y_m)$, and an index of the block "m" is $(X_m, Y_m)$, "l" may be defined as expressed in the following Equation (5), and "θ" may be defined as expressed in the following Equation (6).

When the feature point patch statistic calculator 140 has generated M number of multi-scale block-converted patches and N number of statistical values have been calculated in each of the block-converted patches, N number of morphological gradients, "l", and "θ", namely, a total of M×N number of morphological gradients, "l", and "θ", may be calculated in the M block-converted patches.

Figure 8:
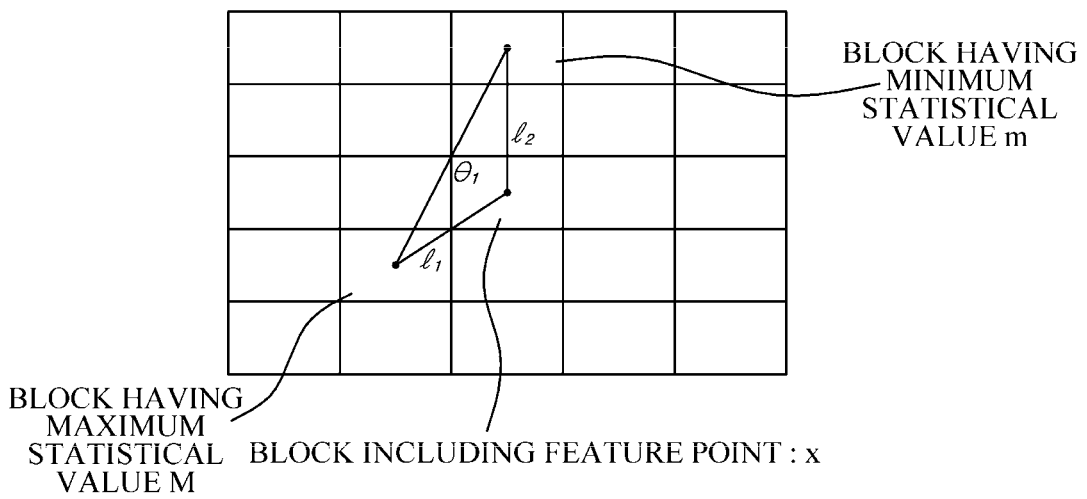
FIG. 8 is a diagram for describing calculation of a morphological gradient (dilation residue gradient and erosion residue gradient), "$l_1$", "$l_2$", "θ", and the area of a triangle according to another embodiment of the present invention.

FIG. 8 is a diagram for describing calculation of a morphological gradient (dilation residue gradient and erosion residue gradient), "$l_1$", "$l_2$", "θ", and the area of a triangle according to another embodiment of the present invention.

Referring to FIG. 8, an M block 710 having the maximum statistical value in a block-converted patch, an m block 720 having the minimum statistical value in the block-converted patch, and an x block 730 including a feature point are illustrated.

The feature point extracting apparatus calculates a dilation residue gradient, an erosion residue gradient, a distance "$l_1$" between the M block and the x block, a distance "$l_2$" between the x block and the m block, and an angle "$\theta_1$" between a line segment connecting the M block and the x block and a line segment connecting the m block and the x block. The feature point extracting apparatus calculates an area "Surface = $l_1 l_2 \sin \theta_1 / 2$" of a triangle that three blocks form. When $\theta_1 = 180$, the three blocks form a straight line, and the area of the figure becomes 0.

According to an embodiment of the present invention, in calculating a morphological gradient and a plurality of relevant values, when a difference between the maximum statistical value "S(M)" and the minimum statistical value "S(m)" is less than or equal to a predetermined threshold value, or there are a plurality of maximum statistical values and minimum statistical values, or when a difference between the maximum statistical value and the second highest value is less than or equal to the predetermined threshold value and a difference between the minimum statistical value and the second lowest value is less than or equal to the predetermined threshold value, the feature point extracting apparatus does not calculate "l", "θ", a dilation residue gradient, an erosion residue gradient, "$l_1$", "$l_2$", "$\theta_1$", and a surface value corresponding to an area of each triangle, and the feature descriptor extractor 160 does not extract a feature descriptor.

Figure 9:
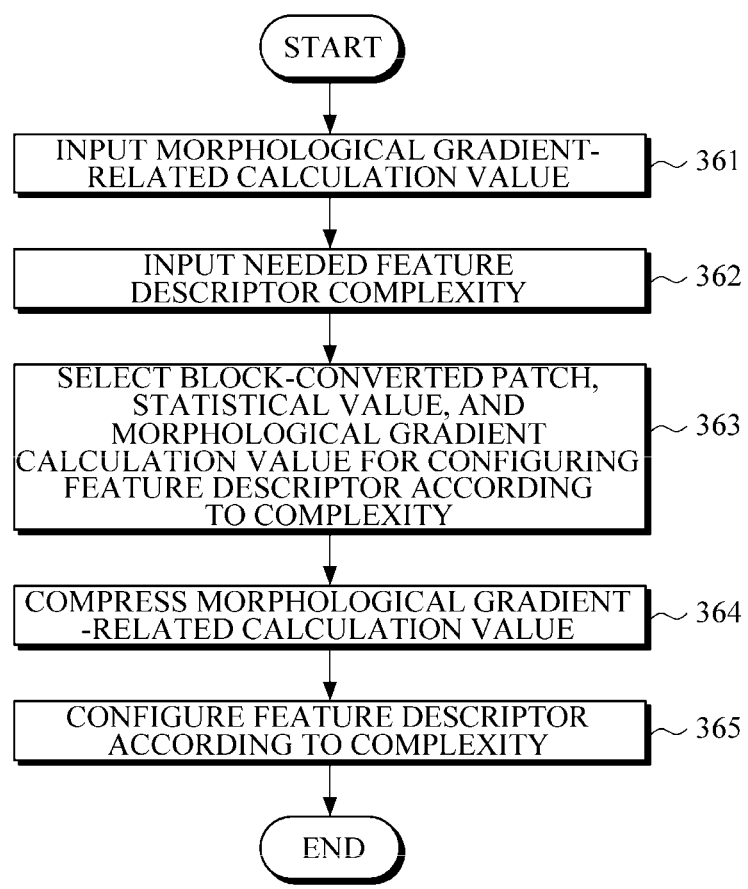
FIG. 9 is a flowchart for describing an operation of generating a feature descriptor according to an embodiment of the present invention.

FIG. 9 is a flowchart for describing an operation of generating a feature descriptor according to an embodiment of the present invention.

Referring to FIG. 9, the feature descriptor extractor 160 receives nine values (for example, a morphological gradient, "l", "θ", a dilation residue gradient, an erosion residue gradient, "$l_1$", "$l_2$", "$\theta_1$", and an area "surface" of a triangle) that have been calculated as N number of statistical values in each of M number of block-converted patches by the morphological gradient calculator 150, and generates a feature descriptor in operation 361.

To this end, the feature descriptor extractor 160 receives the complexity of a necessary feature descriptor in operation 362. As described above, the object of the present invention is to extract and match a scalable feature descriptor having scalability according to a purpose and an environment of an application of the technology for extracting a feature descriptor. The feature descriptor extractor 160 can extract a simplified feature descriptor suitable for a mobile environment, or extract an advanced feature descriptor for high performance.

When the feature point and patch extractor 130 has extracted M number of block-converted patches and the feature point patch statistic calculator 140 has calculated N number of statistical values, the morphological gradient calculator 160 calculates nine values for the N statistical values of each of the M block-converted patches, and thus, a feature descriptor having the highest complexity may be configured with M×N×9 number of values.

The descriptor is suitable as an advanced feature descriptor for high performance. However, when a feature descriptor application needs to operate in a mobile environment or requires a fast operation time instead of high performance, a feature descriptor having relatively low complexity may be configured.

According to an embodiment of the present invention, in some of the M block-converted patches (for example, two block-converted patches), a morphological gradient-related value that has been calculated with some of the N statistical values (for example, two values, namely, average and variance) may be used to configure a feature descriptor.

Moreover, only some of the nine values are used as the morphological gradient-related value, and thus, various feature descriptors may be generated to provide the characteristics and performance needed in a feature descriptor. Accordingly, the feature descriptor extractor 160 selects a block-converted patch, a statistical value, and a morphological gradient-related calculation value for configuring a feature descriptor according to the received complexity of the feature descriptor in operation 363.

Subsequently, the feature descriptor extractor 160 compresses the morphological gradient-related calculation value to reduce the data size of the feature descriptor in operation 364. "l", "θ", and a surface value before compression have real number values. However, the kinds of values that "l", "θ", and the surface value may have are limited in a predetermined block-converted patch, and thus may be compressed to low bits.

Finally, the feature descriptor extractor 160 configures a feature descriptor by using the compressed values in operation 365.

Figure 10:
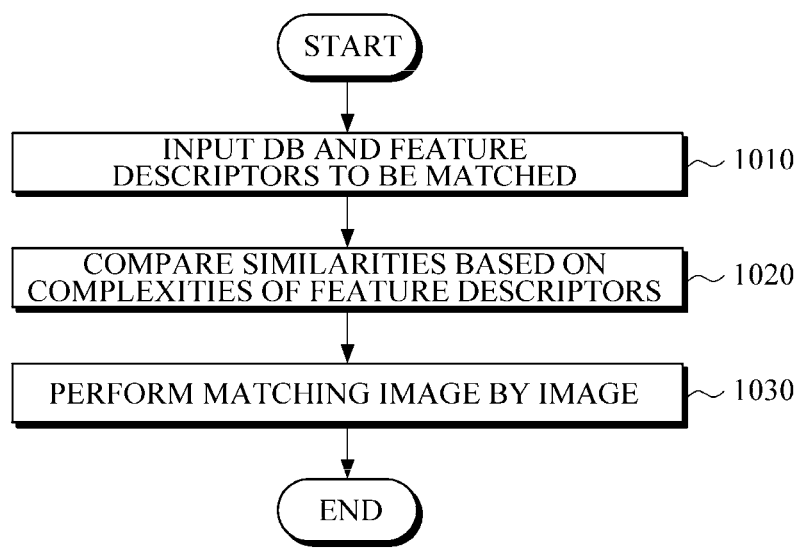
FIG. 10 is a flowchart for describing a method of matching a feature descriptor according to an embodiment of the present invention.

FIG. 10 is a flowchart for describing a method of matching a feature descriptor according to an embodiment of the present invention.

Referring to FIG. 10, first, a database (DB) and two feature descriptors to be matched are input in operation S1010. The matching method compares similarities based on the complexities of the feature descriptors in operation 1020. According to an embodiment of the present invention, when an extracted feature descriptor includes a morphological gradient or a dilation residue gradient and an erosion residue gradient, and respective morphological gradient values are "$MG_A$" and "$MG_B$", similarity "$D_1$" between the two feature descriptors may be defined as expressed in Equation (7). The lower the similarity "$D_1$", the more similar the two feature descriptors.

$$D_1 = \frac{|MG_A - MG_B|}{MG_A + MG_B} \quad (7)$$

According to an embodiment of the present invention, when each feature descriptor includes "l" and "θ", and the "l" and "θ" of the two feature descriptors to be matched are "$l_A$", "$l_B$", "$θ_A$", and "$θ_B$", similarity "$D_2$" between the two feature descriptors may be defined as expressed in Equation (8). The higher the similarity "$D_2$", the more similar the two feature descriptors.

$$D_2 = \frac{l_A l_B}{\max(l_A l_B)^2} \cos(θ_A - θ_B) \quad (8)$$

According to an embodiment of the present invention, when each feature descriptor includes an area "surface value" of a triangle and the surface values of the two feature descriptors to be matched are "$Surface_A$" and "$Ssurface_B$", similarity "$D_3$" between the two feature descriptors may be defined as expressed in Equation (9). The lower the similarity "$D_3$", the more similar the two feature descriptors.

$$D_3 = \frac{|Surface_A - Surface_B|}{Surface_A + Surface_B} \quad (9)$$

When the similarities satisfy a predetermined threshold value and other conditions, the two feature descriptors are determined to match.

The number of similarities depends on the number and statistical values of block-converted patches included in a feature descriptor, and thus, matching can be efficiently performed based on various combinations of similarities.

The matching method involves comparing all similarities between feature descriptors and then performing matching image by image according to the comparison result in operation 1030. According to an embodiment of the present invention, the matching method counts the number of matched feature descriptors image by image, thereby matching images.

The present invention generates a scalable feature descriptor having scalability according to a purpose and an environment to which technology for extracting a feature descriptor is applied, thereby providing various feature descriptors suitable for a mobile environment or a high-performance PC environment. Also, the present invention varies complexity and extracts a feature descriptor in accordance with whether the number of operations for extracting and matching a feature descriptor is required to be low or performance is required to be high, and thus, the scalable feature descriptor can increase efficiency in extracting and matching.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A feature descriptor extracting method in a feature descriptor extracting apparatus, the feature descriptor extracting method comprising:
   receiving an image from which a feature descriptor will be extracted;
   extracting a point at which a change in a pixel statistical value of the image is large as a feature point, and extracting a patch centered on the feature point;
   block-converting the patch and calculating a statistical value of each of a plurality of patch blocks;
   calculating a morphological gradient by using a statistical value of the block-converted patch; and extracting a feature descriptor by using the morphological gradient in consideration of required feature descriptor complexity.

2. The feature descriptor extracting method of claim 1, further comprising converting the received image into a black image, and normalizing a size of the black image to a fixed size in consideration of a ratio of the received image.

3. The feature descriptor extracting method of claim 1, wherein the statistical value comprises an average value, standard deviation, and high-dimensional statistical value of the patch block.

4. The feature descriptor extracting method of claim 1, wherein the calculating of the statistical value comprises:
   block-converting the extracted patch;
   calculating an average of each of the patch blocks;
   calculating a standard deviation of each of the patch blocks; and
   calculating a high-dimensional statistical value of each of the patch blocks.

5. The feature descriptor extracting method of claim 4, wherein the block-converting of the extracted patch comprises block-converting an input patch having a certain size to a multi-scale.

6. The feature descriptor extracting method of claim 4, wherein the block-converting of the extracted patch uses an integral image.

7. The feature descriptor extracting method of claim 1, wherein the extracting of the feature descriptor comprises:
   receiving a value comprising a morphological gradient;
   receiving required feature descriptor complexity;
   selecting a block-converted patch, a statistical value, and a morphological gradient calculation value for configuring the feature descriptor according to the required feature descriptor complexity; and
   configuring the feature descriptor by using the selected values.

8. The feature descriptor extracting method of claim 7, further comprising compressing the morphological gradient calculation value.

9. A feature descriptor extracting apparatus, comprising:
   an image input unit configured to receive an image from which a feature descriptor will be extracted;
   a feature point and patch extractor configured to extract a point at which a change in a pixel statistical value of the image is large as a feature point, and extracting a patch centered on the feature point;
   a feature point patch statistic calculator configured to block-convert the patch and calculate a statistical value of each of a plurality of patch blocks;
   a morphological gradient calculator configured to calculate a morphological gradient by using a statistical value of the block-converted patch; and
   a feature descriptor extractor configured to extract a feature descriptor by using the morphological gradient in consideration of required feature descriptor complexity.

10. The feature descriptor extracting apparatus of claim 9, further comprising an image preprocessor configured to convert the received image into a black image, and normalizing a size of the black image to a fixed size in consideration of a ratio of the received image.

11. The feature descriptor extracting apparatus of claim 9, wherein the feature descriptor extractor selects a block-converted patch, a statistical value, and a morphological gradient calculation value for configuring the feature descriptor according to the required feature descriptor complexity, and configures the feature descriptor by using the selected values.

* * * * *